United States Patent

Kemper et al.

[15] 3,696,428
[45] Oct. 3, 1972

[54] ADF NEEDLE STABILIZING CIRCUIT

[72] Inventors: Arthur L. Kemper; Raymond R. Blaiklock, both of Marion, Iowa

[73] Assignee: Collins Radio Company, Cedar Rapids, Iowa

[22] Filed: July 30, 1970

[21] Appl. No.: 59,610

[52] U.S. Cl. ............................................. 343/117 R
[51] Int. Cl. ............................................... G01s 3/42
[58] Field of Search ........................... 343/117 R, 7.4

[56] References Cited

UNITED STATES PATENTS 3,150,373   9/1964   Kadron et al. .......... 343/117 R
3,206,753   9/1965   McCoy ................... 343/117 R Primary Examiner—Benjamin A. Borchelt
Assistant Examiner—Richard E. Berger
Attorney—Robert M. Sperry and Robert J. Crawford

[57] ABSTRACT

This invention relates to means for preventing random wandering of an ADF indicator needle by sensing the magnitude of the "error" signal and shunting out the gain control of the servo amplifier when the magnitude of the "error" signal exceeds a preselected threshold value.

4 Claims, 1 Drawing Figure

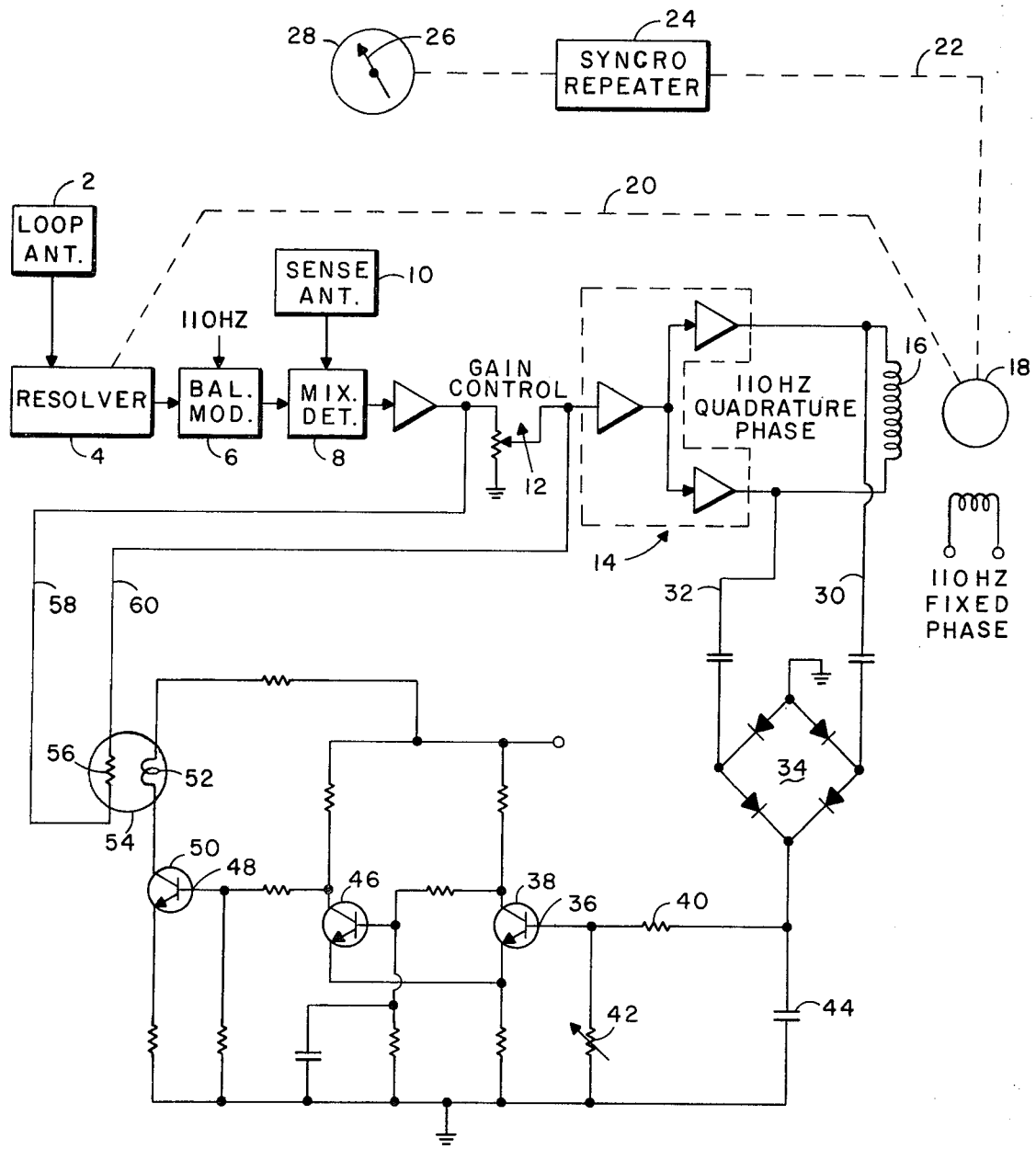

ADF NEEDLE STABILIZING CIRCUIT

This invention relates to radio navigation systems and is particularly directed to means for stabilizing the needles of automatic direction finding systems.

The use of automatic direction finding (ADF) systems as navigation aids for aviation has long been accepted. However, none of the prior art ADF systems have been entirely satisfactory. As is well known, ADF systems operate by having the signal from a directive loop antenna fed through a balanced modulator to a mixer transformer where it is combined with the signal from a sense antenna in such a way that, if the indicator needle is not pointing toward the transmitter to which the system is tuned, an error signal will be produced which provides a quadrature phase voltage to drive the control winding a two-phase motor which, in conjunction with a fixed or reference phase winding, positions the indicator needle. A rotatable loop antenna may be employed, or, alternatively a fixed loop antenna connected to an electromagnetic resolved, the latter combination comprising a nullable loop antenna means. By mechanically coupling the motor to the loop antenna, or, alternatively the rotor of the resolver, the motor is made to run either clockwise or counterclockwise, depending upon the phase of the error signal, until the loop antenna signal is nulled. Unfortunately, once the indicator needle of the prior art ADF systems has reached the null position, it is subject to random wandering and erratic movement due to such causes as general receiver and antenna noise, modulation of the received carrier, and static noise caused by electrical storms or the like. These movements of the indicator needle have made it difficult, and sometime impossible, to navigate with the prior art ADF systems to the point that the ADF systems of the prior art have generally been relegated to the position of "back up" navigation systems despite the fact that ADF systems are generally less expensive and have greater range than most of the "primary" navigation systems.

These disadvantages of prior art ADF systems are overcome with the present invention and an improved ADF system is provided which is highly sensitive to and quickly responsive to off-course conditions; yet is relatively insensitive to transient signals or electrical disturbances occurring after the null condition has been achieved.

The advantages of the present invention are preferably attained by providing a servo amplifier having high gain in the off-course condition, and providing means for shunting the gain control of the servo amplifier when the desired null condition has been attained.

According, it is an object of the present invention to provide an improved ADF system.

Another object of the present invention is to provide an ADF system which is highly sensitive to and quickly responsive to off-course conditions, yet is relatively insensitive to transient signals or electrical disturbances occurring after the null condition has been achieved.

A specific object of the present invention is to provide an ADF system including a servo amplifier having high gain in the off-course condition together with means for shunting the gain control of the servo amplifier when the desired null condition has been attained.

These and other objects and features of the present invention will be apparent from the following detailed description taken with reference to the accompanying drawing.

In the drawing:

The FIGURE is a diagrammatic representation of an ADF system embodying the present invention.

In that form of the present invention chosen for purposes of illustration, the drawing shows an ADF system having a fixed position directive loop antenna 2 connected to pass signals through a resolver 4 and balanced modulator 6 to a suitable mixer transformer 8, which is also connected to receive signals from a sense antenna 10. The mixer 8 combines the signals from the loop antenna 2 with the signals from the sense antenna 10 to produce an "error" signal. This error signal is passed through a gain control 12 and servo amplifier 14 to provide a quadrature phase voltage to a control winding 16 which serves to drive a two-phase motor 18 in conjunction with a fixed phase (reference) winding. The motor 18 is mechanically coupled to the resolver 4 as indicated by dashed line 20, and, hence, will run either clockwise or counterclockwise, depending upon the phase of the error signal, until the resolver 4 reaches a null position. In addition, the motor 18 is mechanically coupled, as indicated by dashed line 22, to drive a synchro repeater 24 which, in turn, drives needle 26 of the ADF indicator 28.

To provide the needle-stabilizing features of the present invention, the amplified error signal, appearing across the motor control winding 16, is sampled, as by conductors 30 and 32, and is applied across rectifier bridge 34 to provide a direct voltage signal which is applied to the base electrode 36 of transistor 38 through a suitable voltage divider, such as resistors 40 and 42. Capacitor 44 is a smoothing capacitor which reduces the ripple on the direct voltage signal. Transistors 38 and 46 are connected in a Schmitt trigger configuration and serve to control the voltage applied to the base electrode 48 of transistor 50 which, in turn, controls the flow of current through lamp circuit 52 of a light-sensitive resistor 54 having a resistance element 56 which exhibits minimum resistance when the lamp 52 is turned "ON." Conductors 58 and 60 serve to connect the resistance element 56 in shunt with the gain control 12 of servo amplifier 14.

In operation, when a large "off-course" condition exists, the signal detected by loop antenna 2 is passed through resolver 4 and balanced modulator 6 to mixing transformer 8 where it is combined with the signal from sense antenna 10 to produce an "error" signal. This "error" signal is amplified by servo amplifier 14 and is applied to the quadrature control winding 16 of motor 18. At the same time, the error signal applied to the control winding 16 is sampled by sampling conductors 30 and 32 and is rectified by rectifier bridge 34 to produce a direct voltage across voltage divider 40 and 42. The magnitude of this direct voltage is directly related to the magnitude of the "error" signal produced by mixing transformer 8 and, hence, will be large when a large "off-course" condition exists. This large direct voltage is applied to the base electrode 36 of transistor 38 and serves to actuate the trigger circuit formed by transistor 38 and 46 which, in turn, causes transistor 50 to conduct and to light lamp circuit 52 of light-sensitive resistor 54. When lamp circuit 52 is lit, the resistance of resistance element 56 falls to its minimum value and, since conductor 58 and 60 connect resistance element 56 in shunt with the gain control 12 of servo amplifier 14, this causes servo amplifier 14 to be maintained at maximum gain which results in supplying a maximum signal to quadrature windings 16 of motor 18. This serves to drive motor 18 and indicator needle 26 at maximum speed and, through sampling conductor 30 and 32, assures continuance of the maximum gain condition so long as the large "off-course" situation exists.

However, as motor 18 acts, through mechanical coupling 22 and synchro repeater 24, to drive indicator needle 26; it also acts, through mechanical coupling 20, to drive resolver 4 toward its null position. This reduces the magnitude of the signal passed by the resolver 4 and, hence, reduces the magnitude of the "error" signal which is developed by mixing transformer 8 and is passed through servo amplifier 14 to the control winding 16 of motor 18. The reduction in magnitude of the signal applied to the control winding 16 causes a similar reduction in the magnitude of the direct voltage which is developed across voltage divider 40 and 42 and is applied to the base electrode 36 of transistor 38. This process continues as the "off-course" condition diminishes until, when an "on-course" condition is approximated, the magnitude of the direct voltage developed across voltage divider 40 and 42 falls below the triggering value of the base electrode 36 of transistor 38. When this occurs, the trigger circuit formed by transistor 38 and 46 acts to render transistor 50 non-conductive, which serves to extinguish lamp circuit 52 and raises the resistance of resistance element 56 to its maximum value. This effectively removes the shunt from gain control 12 and allows gain control 12 to restrict the gain of servo amplifier 14 to a predetermined value which is, preferably, significantly lower than the maximum gain value. Subsequent to this, occurrence of random signals which would cause wandering of the indicator needle in prior art ADF systems are of no consequence with the present system due to the low gain of servo amplifier 14. Moreover, transient signals will normally have insufficient magnitude to develop a direct voltage across voltage divider 40 and 42 great enough to trigger transistor 38 or will dissipate before lamp circuit 52 has become fully illuminated. The width in degrees of the region about a true "on-course" condition for which servo amplifier 14 is maintained in a low gain condition can be controlled by adjusting the value of resistor 42 which controls the triggering level of transistor 38. In practice, salutary results have been achieved by maintaining the width of this region to plus or minus 1.5°.

Obviously, numerous variations and modifications may be made without departing from the present invention. Accordingly, it should be clearly understood that the form of the present invention described above and shown in the accompanying drawing is illustrative only and is not intended to limit the scope of the invention.

What is claimed is:

1. An ADF system comprising:
   a directive loop antenna means including mechanically positionable means for nulling the output signal therefrom,
   balanced modulator means connected to receive the output signal from said directive loop antenna means and serving to periodically reverse the phase of said output signal,
   a sense antenna,
   mixer means connected to receive signals from said sense antenna and said balanced modulator and establishing an error signal indicative of the magnitude of any off-course condition,
   a two-phase motor having a reference phase winding and a control winding respectively arranged in quadrature,
   a servo amplifier connected to receive and amplify said error signal and to apply said error signal to said control winding to drive said motor,
   indicator means for indicating the relative bearing to a source of signals being received by said loop antenna means,
   mechanical means coupling said motor to drive said loop antenna mechanically positionable means and said indicator means,
   gain control means connected to limit the gain of said servo amplifier to a predetermined value, and
   switching means connected across said control winding to sample said error signal and serving to maintain said gain control means inoperative during intervals when the magnitude of said error signal exceeds a preselected value.

2. The apparatus of claim 1 wherein said switching means comprises:
   rectifier means connected to receive said error signal and to produce a direct voltage having a magnitude corresponding to the magnitude of said error signal,
   variable resistance means connected in shunt with said gain control means, and
   a switch circuit connected to receive said direct voltage responsive to values of said direct voltage above a preselected value to maintain said variable resistance in a low resistance condition and responsive to values of said direct voltage below said preselected value to maintain said variable resistance in a high resistance condition.

3. The apparatus of claim 2 wherein said variable resistance means comprises:
   a lamp circuit connected to be illuminated or extinguished under the control of said switch circuit, and
   a resistance element connected in shunt with said gain control means and having a value of resistance inversely related to the intensity of light incident on said resistance element from said lamp.

4. The apparatus of claim 3 wherein said switch circuit comprises:
   rectifier means connected across said control winding and serving to produce a direct current signal having a magnitude indicative of that of said error signal,
   voltage divider means connected to receive said direct current signal and convert it to a direct voltage,
   a pair of transistors connected in Schmitt trigger configuration having the base electrode of one of said transistors connected to receive said direct voltage and having the output of said Schmitt trigger connected to control the flow of current through said lamp circuit.

* * * * *